(No Model.)

W. COURTENAY.
NUT LOCK.

No. 256,642.  Patented Apr. 18, 1882.

WITNESSES:
M. E. Gilford
Luke Madigan

INVENTOR:
William Courtenay
by Wyllys Hodges Atty

UNITED STATES PATENT OFFICE.

WILLIAM COURTENAY, OF NEW YORK, N. Y., ASSIGNOR TO THE GELATINIZED FIBRE COMPANY, OF NEW YORK.

NUT-LOCK.

SPECIFICATION forming part of Letters Patent No. 256,642, dated April 18, 1882.

Application filed January 26, 1882. (No model.)

*To all whom it may concern:*

Be it known that I, WILLIAM COURTENAY, of the city, county, and State of New York, have invented a new and Improved Washer for Nuts, of which the following is a full, true, and exact description, reference being had to the drawings, in which—

Figure 1:
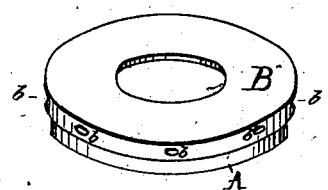
Figure 2:
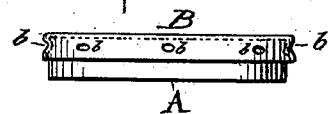
Figure 3:
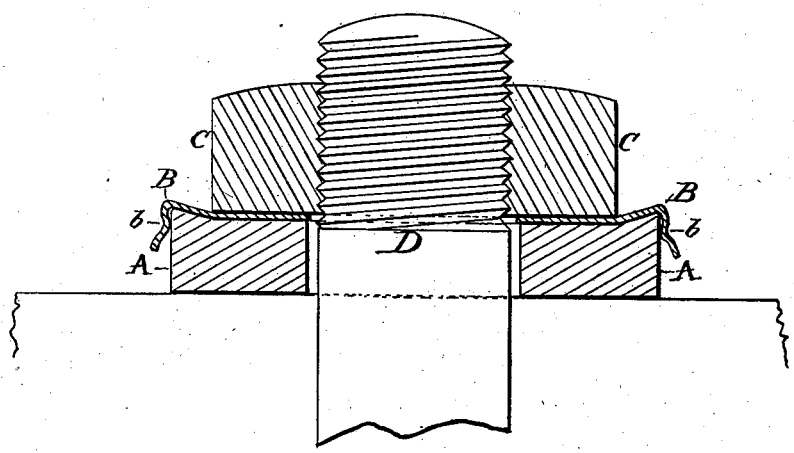

Figure 1 is a perspective view, and Fig. 2 an elevation, of the washer before use; and Fig. 3 a section, showing the washer after it has been applied, similar letters representing similar parts in the different figures.

A represents the body of the washer; B, a thin metallic flanged cap. C represents the nut, and D the bolt.

This washer is intended primarily for use in places where there is great vibration, tending to release the nut, as in the case of fish-plates, and by its use I am enabled to dispense with complicated and expensive locking devices heretofore applied to nuts and washers.

The body A of the washer I construct of the ordinary size and shape, but of the material known as "vulcanized" or "gelatinized" fiber, which is a vegetable fiber, usually paper, treated with an astringent—such as sulphuric acid or chloride of zinc—and has well-known frictional and compressive properties, which adapt it for use as a washer. This body A, I cover with a cap, B, of some thin and flexible metal—such as tin-plate.

The cap B is secured to the body A by having its flange pinched or compressed onto the latter, either entirely around its circumference or at points *b b*, after the ordinary manner of securing thimbles to umbrella-handles. Wooden washers have been before made with wrought metallic caps to strengthen the wood, and fiber washers have been provided with plates of cast-iron or other rigid metal, made smaller than the washer and placed between the body of the washer and the nut. These I do not claim. The cap in my washer can be secured to the body of fiber by simply compressing or crimping it, and when the nut is screwed home the part of the washer and cap directly under the nut will be compressed, and that part of the cap which lies outside of the nut will be thereby bent up around the latter and automatically lock it in position, as shown in Fig. 3. This locking action will be increased and made effectual by the action of the weather upon the fiber, which will absorb moisture, and its uncompressed edges swell up, forcing the cap to bend still farther.

It will be understood, therefore, that by the word "fiber" I do not mean any fibrous material, but only such as have been treated with astringents, so as to be substantially the same as vulcanized or gelatinized fiber, and that the cap B is to be flanged and secured to the body A by pinching, crimping, or in some similar way.

What I claim, and desire to secure by Letters Patent, is—

1. A compound washer, having a body, A, of fiber, and upon one side only of the body A a flanged cap, B, secured to it by pinching or crimping.

2. A compound washer, having a body, A, of fiber, and a flanged cap, B, made of thin metal, so that the edges of cap may tend to bend up around and lock the nut when the latter is screwed home, substantially as described.

WILLIAM COURTENAY.

Witnesses:
 CHARLES H. LUSCOMB,
 LUKE MADIGAN.